United States Patent Office 3,177,997
Patented Apr. 13, 1965

3,177,997
ELECTRIC CLUTCH AND AUTOMATIC
STARTING FOR ENGINES
Paul J. Louzecky, Milwaukee, Wis., assignor to Nordberg Manufacturing Company, Milwaukee, Wis., a corporation of Wisconsin
Filed Apr. 19, 1961, Ser. No. 104,031
2 Claims. (Cl. 192—84)

This invention relates to an improved magnetic clutch such as may be used, for example, in an automatic power plant, a water pumping station, flood control station, an air ventilating site, or the like where a rotating flywheel is used to start a stationary standby engine upon interruption of the normal electrical power supply.

One purpose of this invention is a magnetic clutch of the type described where the rotating flywheel forms one of the clutch elements.

Another purpose is an improved magnetic clutch for use in coupling a rotating shaft to a relatively stationary shaft and for transmitting a large torque from the rotating shaft to the stationary shaft simultaneously with the closing of the clutch.

Another purpose is a magnetic clutch of the type described having having means for adjusting the spacing of the air gap between the clutch members.

Another purpose is a simply constructed magnetic clutch of the type described having a controlled force of attraction between clutch elements and hence a controllable slip between members.

Another purpose is a magnetic clutch of the type described having improved wearability.

Other purposes will appear in the ensuing specification, drawings and claims.

Figure 1:
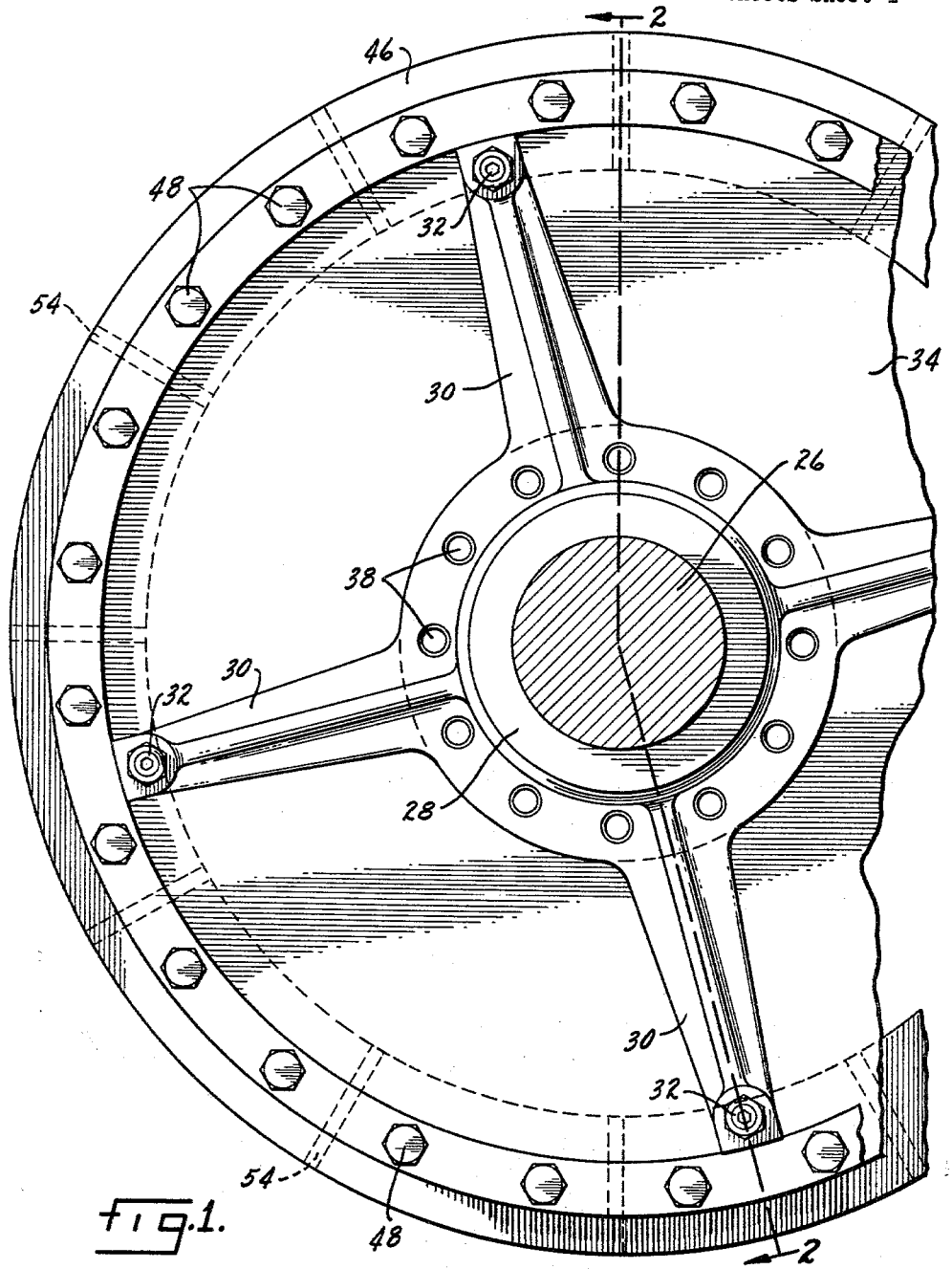
Figure 2:
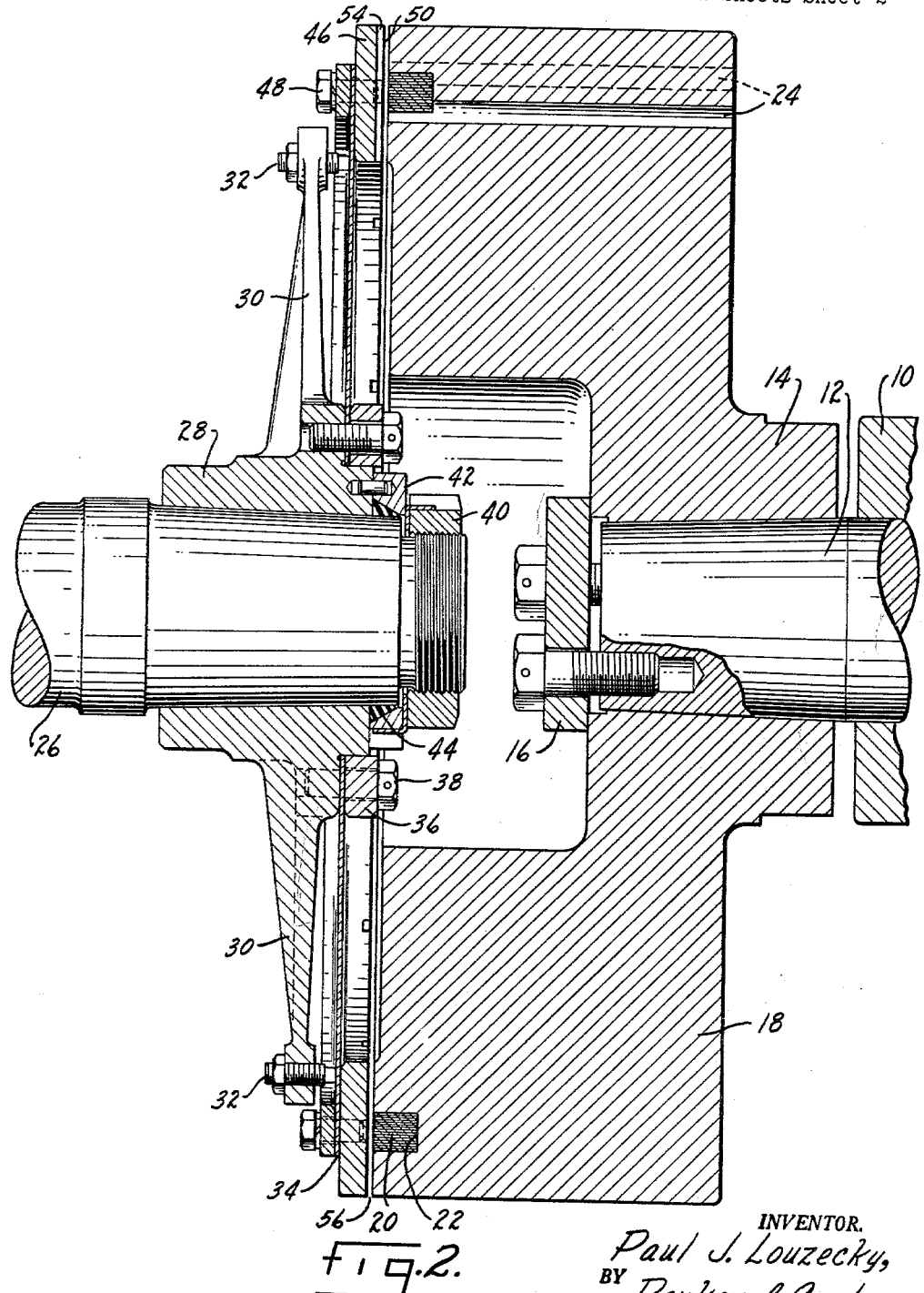

The invention is illustrated diagrammatically in the following drawings, wherein:

FIGURE 1 is an end view, from the left-hand side of FIGURE 2, showing the clutch of this invention; and FIGURE 2 is a section along plane 2—2 of FIGURE 1.

In FIGURE 2, a starting-generating dynamo is diagrammatically indicated at 10. The term starting-generating dynamo is meant to include any type of unit which may function both as a generator and as a motor. For example, a single machine may be wired to operate both as a generator and as a motor, or there may be a separate alternator and a separate motor. In addition the term includes an alternator and a motor excitor. The novelty of this invention does not reside in this unit, and any machine may be used which is effective to operate as a motor when supplied with electric current and to operate as a generator when driven by a suitable prime mover.

A shaft 12 extends outwardly from the unit 10 and fixedly mounts a high inertia flywheel or clutch member 14 which may be formed of a suitable magnetic material such as steel, ductile iron or cast iron. The clutch member 14 is fixed on the shaft 12 by an end plate 16 which overlaps and covers a portion of the member 14. The plate 16 is bolted or otherwise suitably secured to the shaft 12. The member 14 preferably has a large mass such that when rotating it develops a high inertia or torque. The larger portion 18 of the flywheel extends axially beyond the end of the shaft 12 toward the crankshaft of the engine which is associated with the starting-generating dynamo unit.

In order to develop a magnetic force of attraction in the member 14, a suitable electrical coil 20, which may be a circumferentially wound insulated copper tape, is positioned in a groove 22 formed adjacent the outer periphery of the flywheel. It is preferred to have the magnetic field adjacent the outside of the flywheel to thus provide a larger total area for the magnetic field and hence a lower voltage requirement for the coil. Slip rings and brushes are provided to excite the coil electrically. Suitable slots or holes 24 may be formed in the flywheel to provide the electrical connections for the coil 20. Although the coil may take a number of forms, it is preferred to use a thin copper tape with layers of Mylar insulation interposed between each layer of tape. The coil will form a magnetic field in that portion of the flywheel adjacent the groove. The coil is preferably potted or sealed into the groove 22 by a suitable resin. In this connection, the sides of the groove 22 should be rough cut to form a good anchor for the resin.

A shaft 26, which is the crankshaft or a shaft connected to the crankshaft of an internal combustion engine, has a hub 28 fixedly secured thereto. Integral with the hub 28 are a plurality, in this case four, radially extending arms 30 which have adjusting screws 32 mounted at their ends. A circular plate or the like 34, preferably flexible and spring-like and of a thin gauge material, for example steel, is fixed on the hub 28 and to the radial arms 30 by a collar 36 and screws or the like 38. A nut 40 may be threadedly mounted on the end of the shaft 26 and is used to hold the hub 28 in position through a spacer or the like 42 which is sealed to the shaft 26 by a sealing ring 44.

A steel or magnetic armature 46 is mounted on the plate 34 adjacent its outer periphery by means of a plurality of screws or the like 48. Preferably the surface 50 of the armature which opposes the flywheel 14 is divided by radially extending slots 54. These slots are particularly advantageous in reducing or eliminating induced currents in the armature which oppose the flux buildup on the flywheel. These induced currents or bucking currents oppose the magnetic force of attraction of the flywheel and hence slow down the movement of the armature toward the flywheel.

The armature 46 is spaced from the flywheel 14 a distance 56 which is the air gap. The air gap 56 is variable so that the time between application of electrical power to the coil 20 and operation of the clutch may be varied. The adjustment of this time or the adjustment of the air gap is accomplished by the screws 32 which have an end in contact with the back of the plate 34. A further way to adjust the air gap is to vary the voltage applied to the coil 20.

Although the opposing faces of the armature and flywheel are generally radial, it should be realized that one or both of these faces could be slanted or slightly canted to improve the engaging characteristics of the clutch.

Whereas I have used the term "flywheel," it should be understood that this should be interpreted to designate an inertia member of any suitable type.

The use, operation and function of the invention are as follows:

Shown and described herein is an improved magnetic clutch for connecting a relatively stationary shaft with a rotating shaft. The clutch includes a flywheel or high inertia member as one of its elements. The high inertia member is fixed on the rotating shaft or driven by the rotating shaft so that as soon as the clutch or coupling is completed the inertia from the rotating member is immediately transferred to the stationary shaft.

Clutches of the type shown have particular application in remote power plants. The unit 10 illustrates a starting-generating dynamo which may be a unit wired to act both as a generator and as a motor or it may represent separate machines, one an alternator and another a motor. In any event, the unit 10 diagrammatically illustrates a machine or unit which can operate both as a motor and as a generator or as a motor and pump. In fact, the arrangement could include an engine, clutch motor and pump. In the event of a power failure the inertia of the rotating mass would start the engine which would then supply power for driving the pump, preventing interruption of the fluid supply. The crankshaft 26 represents a standby engine which is used to drive the unit 10 in the event of failure of the normal power suply. The standby engine may be any one of a variety of internal combustion engines, for example, oil, gasoline, diesel fuel, or even a gas turbine.

In normal use the machine 10 is operated as a motor and is being supplied with electric current from the normal power supply. The machine 10 turns the flywheel 14 mounted on the shaft 12. Upon any interruption in the normal electrical power supply, switching gear, not shown, immediately supplies a small D.C. voltage to the coil 20. A magnetic field is developed in the flywheel which quickly pulls the armature towards the flywheel to couple the shaft 12 with the crankshaft 26. The inertia of the flywheel will be immediately transferred to the crankshaft 26 to start the engine. The engine will be brought up to speed in a minimum number of revolutions. During the short interval that the power is off and there is no drive for the generator 10, the flywheel 14 will provide sufficient turning power or torque to rotate the generator so that a substantially continuous supply of electrical energy will be provided. As soon as the standby engine is up to speed it drives the generator. The clutch will remain in the operated condition until normal power is restored.

Units of this type are particularly useful at remotely located radio relay stations. These stations cannot tolerate any outage of electrical power as they normally transmit telephone conversations, television programs and vital defense communications. Accordingly, the standby engine must be almost instantaneously started and brought up to speed to drive the unit 10 as a generator. The clutch must operate quickly and there must be minimum slippage between the clutch elements. A further use of the invention is in pumping stations which must maintain a continuous supply of fluid. The unit 10 would normally drive the pump, but upon failure of the power supply, the engine would drive the pump through the unit 10.

Although the clutch of this invention has been described in connection with power plants which may be at somewhat inaccessible locations, the clutch and power plant also may be used at hospitals, civil defense locations, and other installations which cannot tolerate any interruption of electrical power or other emergency services.

A further use of the invention is a generator which is normally driven by an engine and has a standby engine positioned at the opposite end of the generator and on a shaft which is axially aligned with the generator shaft. A clutch connects the standby engine and the generator. If the normal engine driving the generator should fail, its clutch would be disengaged, another clutch of the standby engine engaged starting the standby engine which would then drive the generator.

As a specific example of the materials which are suitable for use in the clutch, the flywheel may be formed of a ferrite nodular cast iron which has the advantage of providing both increased magnetic properties and a harder surface to resist scoring and grooving by the clutch armature. The armature may be a leaded steel which has the advantage of increased wearability with only a slight decrease in its magnetic properties. A further feature of the invention is the coating of the armature with a thin, for example 1/32 inch, layer of a wearing material such as bronze or the like. In this case, the air gap could be reduced if necessary to provide the proper magnetic pull. The layer of bronze or other wearing material should be thin so that the magnetic properties of the armature are not materially reduced. Such a design would have an advantage of decreasing the time for operating the clutch and improving the clutch armature wearing characteristics.

Although the magnetic coil has been shown as a circumferentially wound coil, it should be realized that it is also possible to use a number of separate individual coils which are circumferentially spaced around the face of the flywheel opposing the armature. These individual coils could be copper tape, a thin gauge wire or otherwise. The magnetic coil could also be mounted on the movable member or armature, in which case the flywheel could have an axially aligned portion formed of a good magnetic material. Such a construction is advantageous in that it eliminates wear on the brushes and slip rings.

A further feature of the invention is the addition of a series of slots or segments in the face of the armature to reduce the induced currents which normally oppose the magnetic field formed on the flywheel. In this connection, in some applications it may be advantageous to obtain quick separation of the clutch by using a condenser or some other means of providing a bucking or back current to the coil. Such a bucking current would be used to, in effect, push the armature away from the flywheel to speed up disengagement of the clutch. In other words the bucking or reverse current would be supplied to the coil when the clutch is released and would speed up the collapse of the magnetic field. A reverse polarity coil built into the inertia member could also be used to provide a bucking current.

The adjustment for the air gap is important. When an engine and starting-generating dynamo unit is installed on the job, it is necessary to run a few practice starts in order to get the clutch actuating time down to within tolerances. Accordingly, it is necessary to have a means for adjusting the air gap so as to properly set the clutch. This has been provided by spider 30 and adjusting screws 32.

Although the flywheel has been shown as mounted on the rotating shaft, it could be otherwise. The flywheel could be mounted on bearings and freely rotating on the stationary crankshaft and driven by the unit 10. The armature would also be mounted on the engine crankshaft and when the clutch was operated, the armature and flywheel, both on the engine crankshaft, would be coupled together.

Whereas the preferred form of the invention has been shown and described herein, it should be realized that there are many modifications, substitutions and alterations thereto within the scope of the following claims.

I claim:

1. A magnetic clutch for coupling a driving shaft to a driven shaft including a high inertia flywheel fixed on the driving shaft said flywheel having an outer peripheral enlarged area extending toward the driven shaft, means for forming a relatively isolated magnetic field adjacent the outer periphery of said enlarged area including a circumferential clutch near the outer periphery of the enlarged area and a coil positioned in said clutch, a clutch armature spaced from said flywheel and generally axially aligned with said magnetic field, the face of said armature opposing said flywheel being divided into segments, a flexible spring-like plate fixed to said driven shaft and supporting said armature, said plate permitting movement of said armature toward and away from said flywheel in response to changes in said magnetic field, and a plurality of radially extending arms mounted on said driven shaft adjacent said plate, each of said arms carrying an adjustment means positioned to contact said plate for varying the gap between said armature and said flywheel.

2. The structure of claim 1 further characterized in that said adjustment means include adjustment screws mounted at the radial end of said arms and contacting said plate.

References Cited by the Examiner

UNITED STATES PATENTS

| | | |
|---|---|---|
| 1,491,426 | 4/24 | Schunemann. |
| 1,511,491 | 10/24 | Aspden. |
| 1,622,261 | 3/27 | Payne. |
| 2,567,636 | 9/51 | Cuny _____ 322—4 X |
| 2,661,086 | 12/53 | Spase _____ 192—111 |
| 2,684,744 | 7/54 | Myers. |
| 2,710,947 | 6/55 | Gaston _____ 336—60 |
| 2,751,056 | 6/56 | Aumiller et al. |
| 2,912,963 | 11/59 | Dufresne _____ 123—41.12 |
| 2,973,850 | 3/61 | Jaeschke. |
| 2,982,385 | 5/61 | Gamundi. |

FOREIGN PATENTS

| | | |
|---|---|---|
| 15,690 | 6/14 | Great Britain. |
| 151,478 | 9/20 | Great Britain. |

DAVID J. WILLIAMOWSKY, *Primary Examiner.*

ROBERT C. RIORDON, THOMAS J. HICKEY,
*Examiners.*